United States Patent [19]

Takahashi

[11] Patent Number: 5,399,141
[45] Date of Patent: Mar. 21, 1995

[54] ROLLER SUPPORTING STRUCTURE USING A DYNAMIC PRESSURE

[75] Inventor: Takeshi Takahashi, Yamatotakada, Japan

[73] Assignee: Koyo Seiko Co., Ltd., Osaka, Japan

[21] Appl. No.: 132,320

[22] Filed: Oct. 6, 1993

Related U.S. Application Data

[63] Continuation-in-part of Ser. No. 916,259, Jul. 21, 1992, abandoned.

[30] Foreign Application Priority Data

Jul. 23, 1991 [JP] Japan .................... 357427 U

[51] Int. Cl.$^6$ ........................................ B65H 23/025
[52] U.S. Cl. .............................. 492/47; 492/7; 492/16; 29/898.041; 384/112; 384/123; 226/194
[58] Field of Search ............ 29/898.02, 898.041, 29/898.15, 895.2; 492/7, 16, 47; 384/112, 113, 123, 909, 425, 426; 226/179, 192, 194

[56] References Cited

U.S. PATENT DOCUMENTS

| | | |
|---|---|---|
| 3,146,036 | 8/1964 | Benatti .................... 384/113 |
| 3,221,389 | 12/1965 | Cowell . |
| 3,368,851 | 2/1968 | Eggmann . |
| 3,397,439 | 8/1968 | Hanau . |
| 3,420,583 | 1/1969 | Hirs .................... 384/113 |
| 3,950,039 | 4/1976 | Huber et al. . |
| 5,096,309 | 3/1992 | Nakasugi et al. .......... 384/112 |
| 5,127,744 | 7/1992 | White et al. ............ 384/112 |
| 5,277,499 | 1/1994 | Kameyama ............ 384/112 |

FOREIGN PATENT DOCUMENTS

| | | |
|---|---|---|
| 0412509 | 2/1991 | European Pat. Off. ......... 384/113 |
| 2404325 | 7/1975 | Germany . |
| 57-74132 | 5/1982 | Japan .................... 29/898.041 |
| 3-312 | 1/1991 | Japan .................... 384/112 |
| 1310526 | 3/1973 | United Kingdom . |

OTHER PUBLICATIONS

Spiral Groove Bearings, A. E., Muijderman, Philips Technical Library of Phillips, Gloiellampenfabriken, Eindhaven, Netherlands—pp. "Symbols" (5), Chapter 1, First page., and.

Primary Examiner—Tom Hughes
Attorney, Agent, or Firm—Wenderoth, Lind & Ponack

[57] ABSTRACT

A roller supporting structure has a shaft having first grooves for generating a dynamic pressure, and first and second retaining plates placed opposite both ends of a roller when the roller is mounted around the shaft. The first and second retaining plates have second grooves for generating a dynamic pressure on their roller-facing end faces. When the roller is placed in an axially central portion of the shaft, that is, in the middle between the retaining plates, there is left a predetermined gap between the roller-side end face of each retaining plate and each end face of the roller. The gap is large enough so that the second grooves of the first and second retaining plates do not generate dynamic pressure between these retaining plates and the roller. The second grooves of one of the first and second retaining plates generate dynamic pressure when the roller is displaced from the axially central portion toward the one retaining plate.

3 Claims, 4 Drawing Sheets

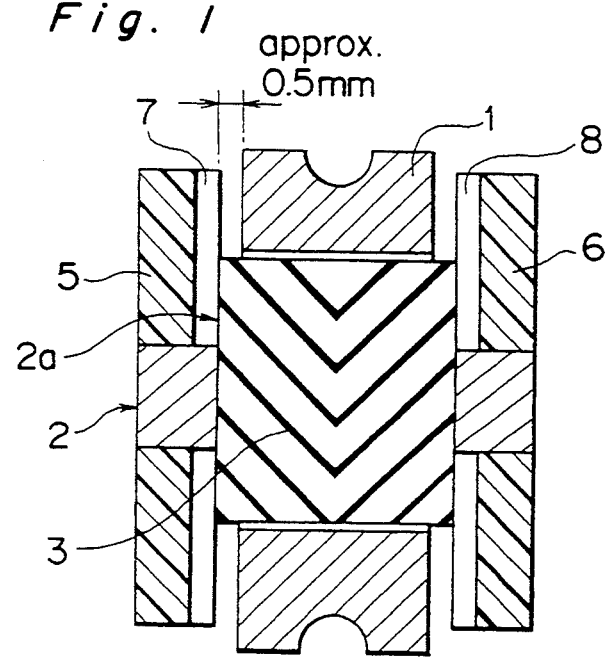
Fig. 1
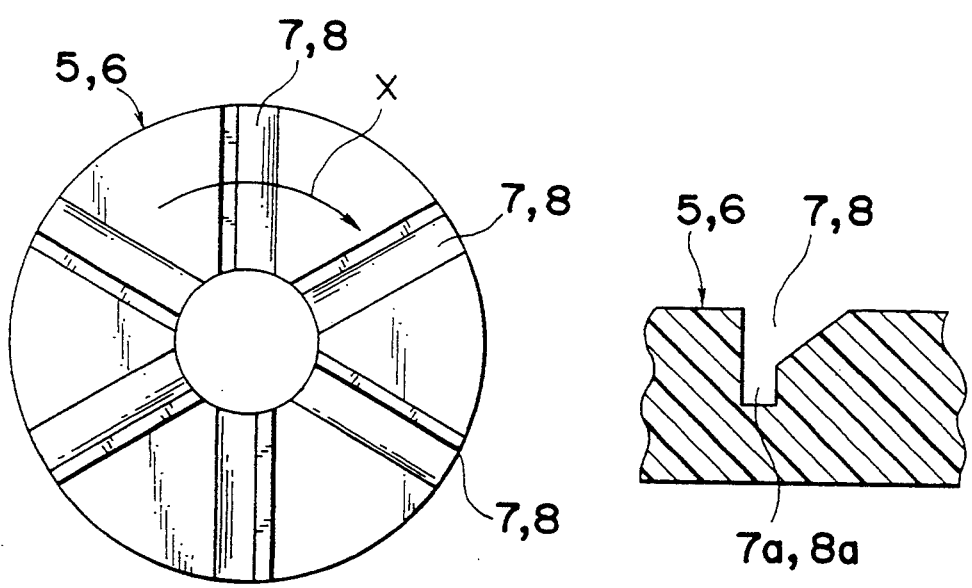
Fig. 2A
Fig. 2B

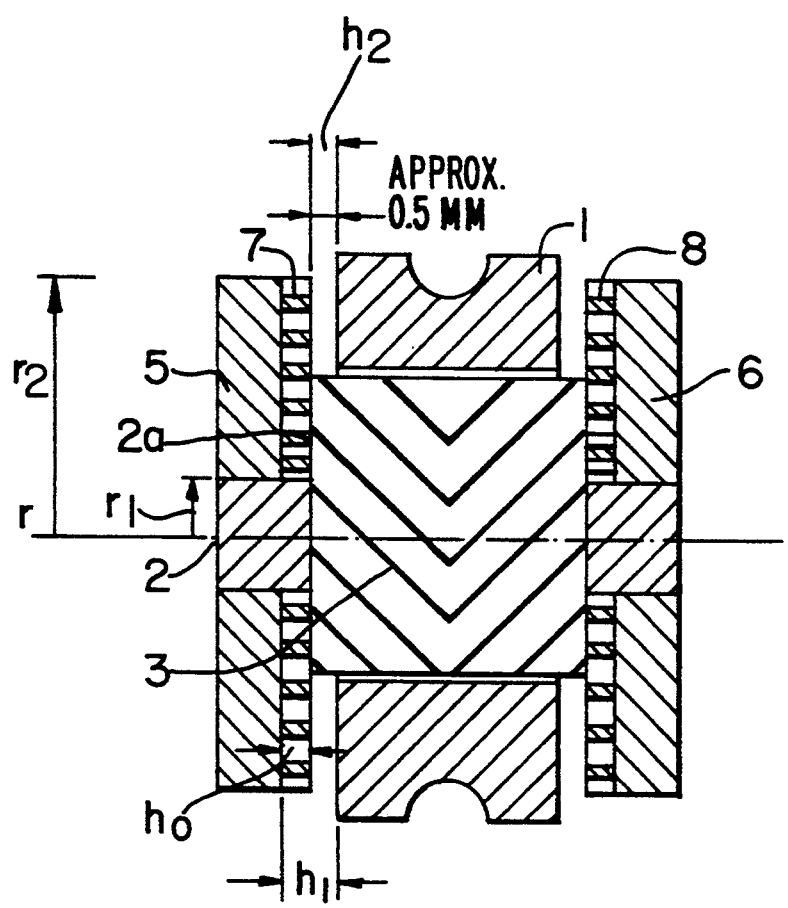

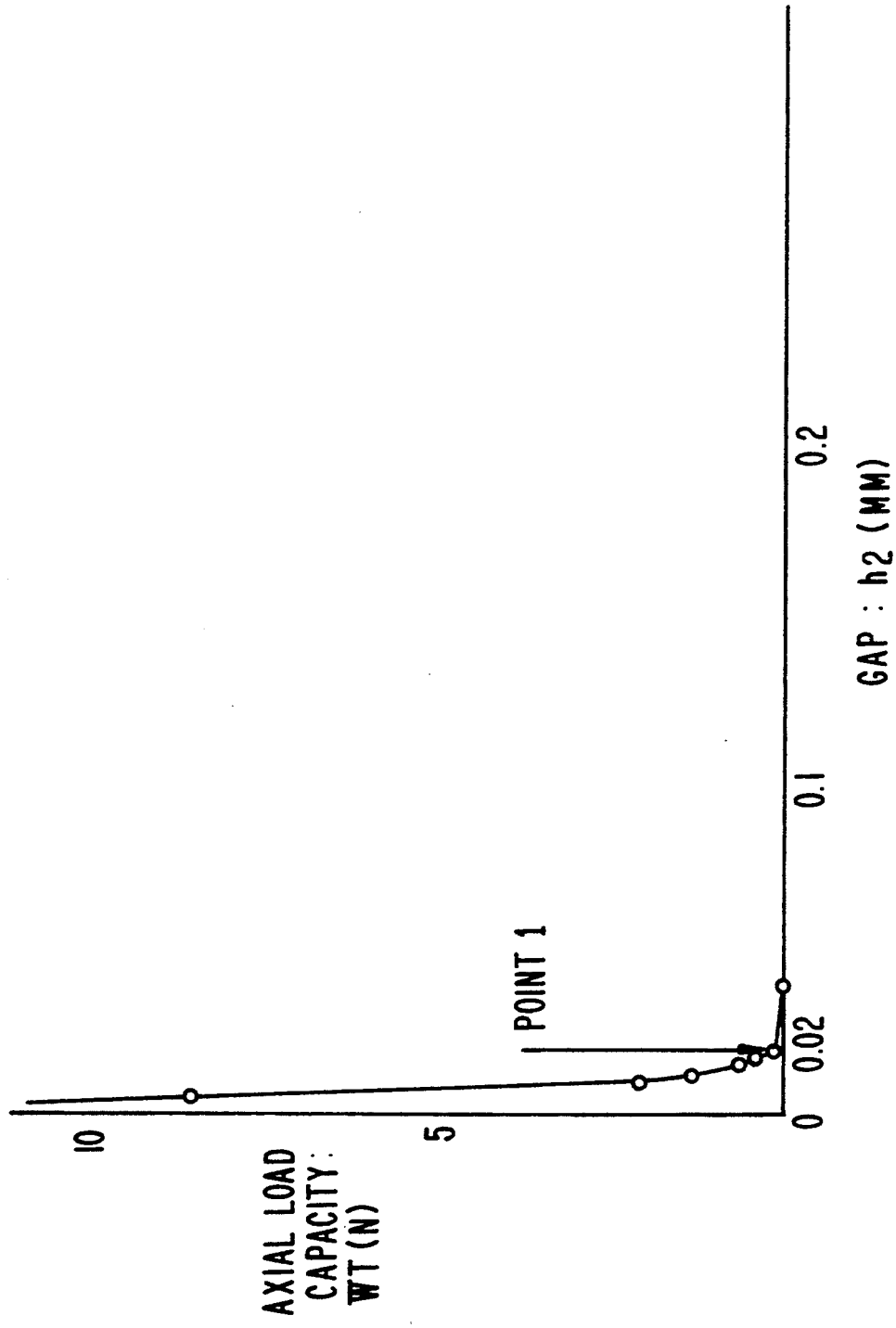

ROLLER SUPPORTING STRUCTURE USING A DYNAMIC PRESSURE

This application is a continuation-in-part of application Ser. No. 07/916,259, filed Jul. 21, 1992, now abandoned.

BACKGROUND OF THE INVENTION

1. Field of the Invention

The present invention relates to a roller supporting structure for e.g., a thread feed roller or the like, which utilizes a dynamic pressure as a support means.

2. Description of the Prior Art

FIG. 3 shows a conventional roller supporting structure. In the supporting structure of FIG. 3, grooves 53 for generating a dynamic pressure are formed in V-shape on an outer peripheral surface of an intermediate shaft part 52a of a larger diameter of a shaft 52 which part supports a roller 51. Retaining plates 55, 56 are fixed to the shaft 52 in a manner to sandwich the roller 51 therebetween from both ends in the axial direction. The roller 51 has permanent magnets 59, 60 fixed to its end faces. On the other hand, permanent magnets 57, 58 are fixedly mounted at roller-facing end faces of the respective retaining plates 55, 56 confronting the end faces of the roller 51. The opposed permanent magnets 57 and 59, 58 and 60 of the retaining plates 55, 56 and the roller 51 are of the same polarity.

As the roller 51 is rotated, a dynamic pressure is generated in an ambient fluid between the shaft 52 and the roller 51 by the grooves 53 of the shaft 52, so that the roller 51 is supported by the dynamic pressure of the fluid in the radial direction. Moreover, a repulsive force between the permanent magnets of the same polarity 57 and 59, 58, 60 supports the roller 51 in the axial direction.

Another conventional roller supporting structure is indicated in FIG. 4. In this supporting structure, grooves 63 for generating a dynamic pressure are formed in V-shape on an outer peripheral surface of an intermediate shaft part 62a, a larger diameter part, of a shaft 62 which part supports a roller 61 as in the roller supporting structure of FIG. 3. The roller 61 is sandwiched between the retaining plates 65 and 66 from both ends thereof in the axial direction with the retaining plates at predetermined distances from the end faces of roller 61. The retaining plates 65, 66 fixed to the shaft 61 also have grooves 67, 68 formed at their roller-side end faces confronting the end faces of the roller 61.

In the roller supporting structure of FIG. 4, when the roller 61 is rotated, the grooves 63 of the shaft 62 cause an ambient fluid between the shaft 62 and roller 61 to have a dynamic pressure and thereby to support the roller 61 in the radial direction with the dynamic pressure. Moreover, the retaining plates 65 and 66 are sufficiently close to the ends of the roller 61 so that grooves 67, 68 of the retaining plates 65, 66 generate a dynamic pressure in an ambient fluid between the roller 61 and the retaining plates 65, 66. Thus the roller 61 is also supported by the dynamic pressure in the axial direction.

The above supporting structures have the following drawbacks. In the former structure using permanent magnets for supporting the roller in the axial direction, the repulsive forces of the permanent magnets 57, 58 and 59, 60 of the retaining plates 55, 56 and the roller 51 cause forces pressing the roller 51 in the opposite axial directions even when the roller 51 is not rotated. Therefore, when there is imbalance between the repulsive forces of the permanent magnets at opposite ends, the imbalance causes a bending moment acting on the roller 51. The bending moment increases a frictional force between the inner peripheral surface of the roller 51 and the outer peripheral surface of the intermediate shaft part 52a of the shaft 52 when the roller 51 starts to rotate. Therefore, a large torque is required to start the roller 51.

Meanwhile, according to the latter arrangement, since it is necessary that the predetermined distance 's' be approximately several μm between each retaining plate 65, 66 and the roller 61, squareness between each retaining plate 65, 66 and the shaft 62 and flatness of the opposed end faces of the roller 61 and the retaining plates 65, 66 must be controlled with high accuracy. Therefore, the component parts, especially the roller 61 and the retaining plates 65, 66, are required to be worked and assembled highly accurately.

SUMMARY OF THE INVENTION

The object of the present invention is therefore to provide a roller supporting structure which can rotate a roller with a small torque and which does not require high accuracy in working and assembling of the roller and retaining plates, as compared with the conventional supporting structure.

In order to accomplish the above object, the present invention provides a roller supporting structure for rotatably supporting a roller, comprising a shaft for rotatably supporting the roller and allowing axial movement of the roller therealong; first grooves formed on at least one of an inner peripheral surface of the roller and an outer peripheral surface of the shaft for generating a dynamic pressure between the shaft and the roller; first and second retaining plates fixed to the shaft and positioned axially at both ends of the roller so that at least a predetermined distance is left between the roller and each of the first and second retaining plates, respectively; and second grooves formed on at least one end face of the roller or a roller-facing face of the first retaining plate confronting the one end face of the roller, and formed on at least the other end face of the roller or a roller-facing face of the second retaining plate confronting the other end face of the roller, for, when a corresponding end face and roller facing face are sufficiently close, generating a dynamic pressure between the roller and each retaining plate, characterized in that the above-mentioned predetermined distance left between the roller and each of the first and second retaining plates is sufficiently large that, a) when the roller stays in the middle between the first and second retaining plates, the second grooves at most generate substantially no dynamic pressure, i.e. they generate from some small unsubstantial dynamic pressure to no dynamic pressure at all, and b) only when the roller is brought close to either of the first and second retaining plates less than said predetermined distance do the second grooves formed on at least the roller-facing face of either retaining plate or the end face of the roller opposed to either retaining plate generate a gradually increasing dynamic pressure greater than said substantially no dynamic pressure to resist movement of the roller toward either the first or second retaining plate.

According to the above-described arrangement of the present invention, when the roller is rotated, the first grooves cause a lubricating fluid present between the roller and the shaft to have a dynamic pressure, whereby the supporting structure supports the roller in the radial direction with the dynamic pressure.

Since the gap between the roller and each of the first and second retaining plates is large (for example, 0.5 mm) enough so that the second grooves at most generate substantially no dynamic pressure in a fluid present between either retaining plate and the roller when the roller stays in the middle between the first and second retaining plates, and the second grooves generate a gradually increasing dynamic pressure in a fluid present between the roller and either of the first and second retaining plates greater than said substantially no dynamic pressure to resist movement of the roller toward either of the retaining plates only when the roller is brought closer to the either retaining plate than said predetermined distance, the predetermined distance is much larger than the gap (several $\mu$m) of the prior art wherein a dynamic pressure sufficient to resist movement of the roller toward the retaining plates is generated at all times between the retaining plates and the roller during the rotation of the roller. Accordingly, the squareness between the shaft and the first and second retaining plates and the flatness of the end faces of the roller and the roller-side end faces of the first and second retaining plates are not required to be so accurate as in the prior art. In consequence, it is not necessary to work and assemble the roller and retaining plates as accurately as in the prior art.

Further, since magnets are not used to support the roller in the axial direction, a bending moment does not act on the roller when the roller is not rotated. Accordingly, a smaller torque is required for starting the roller, as compared with the conventional example using the magnets.

If the first and second retaining plates are formed of plastic having lubricity, the frictional force generated between the roller and the first or second retaining plate can be decreased when the roller is touching the first or second retaining plate during rotation of the roller. The roller can accordingly be rotated smoothly. Moreover, the first and second retaining plates can be molded much easier and therefore manufactured at low cost.

BRIEF DESCRIPTION OF THE DRAWINGS

These and other objects and features of the present invention will become clear from the following description of a preferred embodiment thereof with reference to the accompanying drawings throughout which like parts are designated by like reference numerals, and in which:

FIG. 1 is a cross sectional view of a roller supporting structure according .to the present invention;

FIG. 2A is a plan view of a retaining plate of the structure of FIG. 1, wherein second grooves for generating a dynamic pressure are shown;

FIG. 2B is a sectional view of a part of the retaining plate of FIG. 2A;

FIG. 5 is a cross sectional view, similar to FIG. 1, of a specific embodiment of a roller supporting structure according to the invention; and FIG. 6 is a graph of axial load capacity vs. retaining plate-roller gap for a particular embodiment.

DETAILED DESCRIPTION OF THE PREFERRED EMBODIMENT

Figure 3:
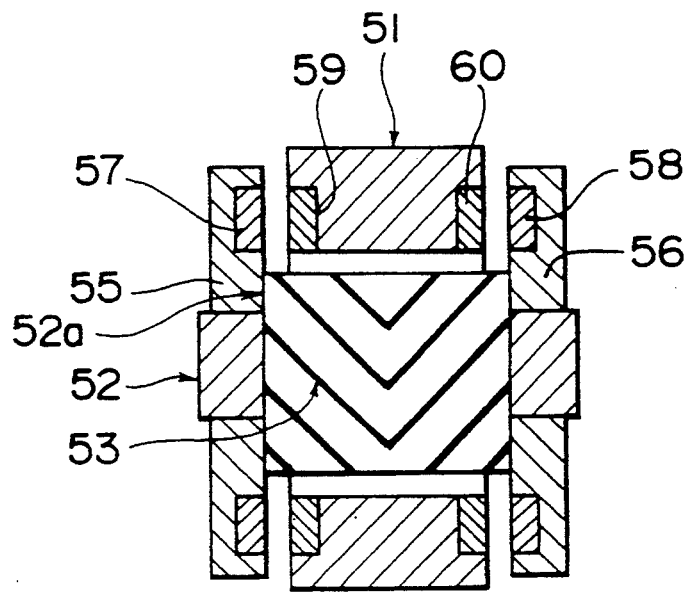
FIG. 3 is a cross sectional view of a conventional roller supporting structure.
Figure 4:
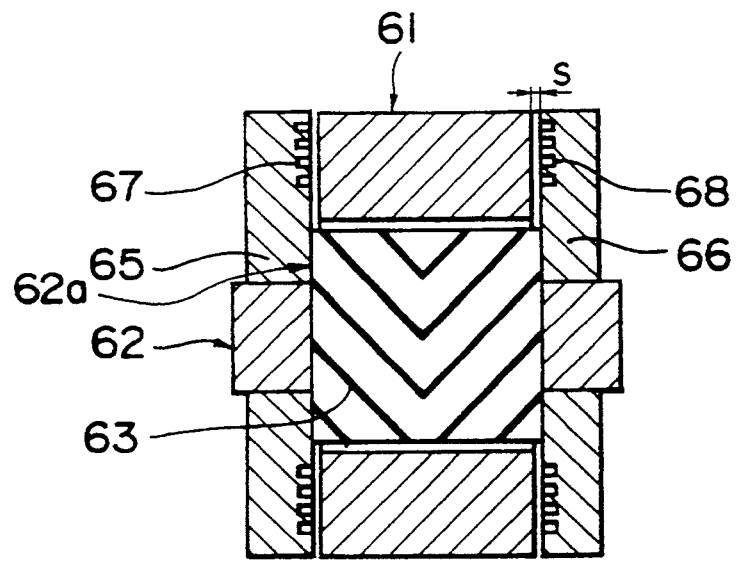
FIG. 4 is a cross sectional view of another conventional roller supporting structure.

A preferred embodiment of the present invention will be described in detail with reference to the accompanying drawings.

FIG. 1 illustrates a roller supporting structure according to a preferred embodiment of the present invention. As shown in this figure, a shaft 2 has an intermediate shaft part 2a of a larger diameter and supports a roller 1 around and in an axially central portion of the intermediate shaft part 2a. First grooves 3 for generating a dynamic pressure are notched in V shape in an outer peripheral surface of the intermediate shaft part 2a of the shaft 2. Retaining plates 5, 6 formed of plastic having lubricity are respectively fixed around opposite end portions of the shaft 2 in a manner to loosely sandwich the roller 1 therebetween from both ends of the roller 1 in the axial direction. The retaining plates 5, 6 rest against end faces of the intermediate shaft part 2a of the shaft 2.

The retaining plate 5 has second grooves 7 for generating a dynamic pressure on its roller-facing end face which confronts one end face of the roller 1 when the roller-facing end face and the end face of the roller are spaced less than a predetermined distance. Similarly, the retaining plate 6 has second grooves 8 on its roller-facing end face which confronts the other end face of the roller 1. The second grooves 7 and 8 are arranged radially on the roller-facing end faces of the retaining plates 5, 6, as shown in FIG. 2A. Moreover, as is clear from FIG. 2B, in this embodiment a cross section of each second groove 7, 8 has a shape of a right triangle with a rectangular portion 7a, 8a projecting inwardly of the retaining plates 5, 6. Due to this shape, it is easy to work the grooves 7, 8 on the end faces of the retaining plates 5, 6.

When the retaining plate 5 is relatively rotated in a direction of an arrow X relative to the roller 1, if the roller 1 is shifted axially so as to be spaced from the retaining plate 5 less than said predetermined distance, the second grooves 7 bring about a gradually increasing dynamic pressure to an ambient fluid between the roller 1 and the retaining plate 5 the closer said end face and roller-facing face come. Similarly, when the retaining plate 6 is relative rotated in a direction of an arrow X relative to the roller 1, if the roller 1 is shifted axially so as to be spaced from the retaining plate 6 less than said predetermined distance, second grooves 8 bring about a gradually increasing dynamic pressure in an ambient fluid between the roller 1 and the retaining plate 6 the closer the end face and the roller-facing face come. Thus gradually increasing dynamic pressure resists movement of the roller 1 toward the respective end plates 5 and 6. However, as described below, the second grooves 7, 8 of the retaining plates 5, 6 at most generate substantially no dynamic pressure when the roller 1 stays spaced from retaining plates at least said predetermined distance, i.e. more or less in the middle between the retaining plates 5, 6, that is, in the axially central portion of the intermediate shaft part 2a. By "substantially no dynamic pressure" is meant insufficient dynamic pressure to move roller 1 axially against inertia, friction and the like. Thus, when the roller and retaining plate are separated by just the predetermined distance or more, any dynamic pressure generated will not move the roller away from the retaining plate. The second grooves 7, 8 generate the gradually increasing dynamic pressure greater than said "substantially no-dynamic pressure" only when the roller 1 is displaced from the axially central portion of the intermediate shaft part 2a toward the retaining plate 5 or 6 and closer than said predetermined distance.

As indicated in FIG. 1, the distance between the retaining plates 5 and 6, that is, the axial length of the intermediate shaft part 2a, is so set that the roller 1 is spaced about as much as 0.5 mm from each of the roller-facing end faces of the retaining plates 5, 6 when the roller 1 is at the axially central portion of the intermediate shaft part 2a. To generate the gradually increasing dynamic pressure, the distance between the roller and the retaining plate must be smaller than the predetermined distance, e.g. as small as several μm. Thus the roller-facing faces of retaining plates 5 and 6 are spaced from each other a distance greater than the axial length of the roller 1 plus twice the predetermined distance. Therefore, only when the roller 1 is displaced in the axial direction of the shaft 2 from the above central portion and comes closer to the retaining plate 5 or 6 than the predetermined distance do the second grooves 7 or generate the gradually increasing dynamic pressure between the roller 1 and the retaining plate 5 or 6 to resist movement of the roller and plates toward each other. Accordingly, although the gap between the retaining plate 5, 6 and the roller 1 when the roller 1 is located at the axially central portion of the shaft 2 is much larger than that in the prior art wherein the movement resisting dynamic pressure is always generated between the retaining plates and the roller during rotation of the roller, the roller supporting structure of the present embodiment can nevertheless axially support the roller 1 with dynamic pressure to prevent engagement of the roller with the retaining plates when necessary.

As a result of such enlarged gap, both the squareness between the shaft 2 and each retaining plates 5, 6 and the flatness of the end faces of the roller 1 and the roller-facing end faces of the retaining plates 5, 6 are not required to be as accurate as in the prior art. Thus, the degree of accuracy required in working and assembling the roller 1 and the retaining plates 5, 6 can be decreased.

In the roller supporting structure of the above-described construction, when the roller 1 is rotated, a dynamic pressure is generated in the ambient fluid present between the roller 1 and the shaft 2 because of the first grooves 3 of the shaft 2, so that the roller 1 is supported in the radial direction by the dynamic pressure. On the other hand, only when the roller 1 is displaced in the axial direction from the axial central position of the shaft 2 and brought closer to the retaining plate 5 or 6 than the predetermined distance to the second grooves 7 or 8 generate a movement resisting dynamic pressure in the ambient fluid between the roller 1 and the retaining plate 5 or 6.

Since the retaining plates 5, 6 are made of plastic having lubricity, it is possible to make as small as possible a frictional force which will act between the roller 1 and the retaining plate 5 or 6 in case they are brought into contact with each other during rotation of the roller 1. Thus, a smooth rotation of the roller 1 is ensured. Moreover, it becomes easy to make the retaining plates 5, 6 by molding the plate material, so that the retaining plates 5, 6 can be produced inexpensively.

According to the present invention, unlike the prior art using magnets for supporting the roller in the axial direction, a bending moment does not act on the roller when the roller is not rotated, and therefore the starting torque of the roller can be reduced.

Although the second grooves 7, 8 having a cross sectional shape of a right triangle with a rectangular portion 7a, 8a are provided radially and the first grooves 3 are formed in V shape, the shapes of the first and second grooves 3, 7, 8 are not restricted to the above, but may be spiral or the like so long as they can generate a dynamic pressure.

Moreover, the first grooves 3 may be provided on an inner peripheral surface of the roller and the second grooves 7, 8 may be provided on the end faces of the roller 1.

From the equations given in the publication Spiral Groove Bearings, by E. A. Muijderman, published by Philips Technical Library of N. V. Phillips Gloiellampenfabriken, Eindhoven, Netherlands, one can easily determine the size of the predetermined distance. An example of such a calculation for a grooved retaining plate as shown in FIG. 5 is as follows:

A bearing with the radius of the outer periphery r for the bearing plate 5 of 1 cm and spiral groove with a groove depth $h_0$ and an angle $a = 20°$ between the velocity vector of the fluid in which the bearing is to run and a tangent to the groove, the ratio $\gamma$ of the width of the ridge between grooves to the width of the groove of 2, and a ratio $\lambda$ of the radius of the inner periphery to the outer periphery of the bearing plate 5 of 0.5, was chosen to be run in air at a speed of 100,000 rpm.

The load carrying capacity Wt is according to the following equation (5.9) of Muijderman:

$$Wt = \frac{3\pi\eta\omega r_2^4}{2h_2^2}(1 - \lambda^4)g_1(a,H,\gamma)C_2(a,H,\gamma,\lambda,\kappa) \tag{5.9}$$

where, $$g_1(a,H,\gamma) = \frac{H^2(\cot a)(1 - H)(1 - H^3)}{(1 + H^3)^2 + 4H^3\cot^2 a} \tag{5.13}$$

$$C_2(a,H,\gamma,\lambda,\kappa) = \frac{e^{-\frac{2\pi}{\kappa}(1 - \frac{a^4}{90})(\tan a)\frac{2}{1+\gamma} \cdot \frac{1+\gamma H^3}{1+H^3}} - \lambda^4 e^{+\frac{2\pi}{\kappa}(1 - \frac{a^4}{90})(\tan a)\frac{2}{1+\gamma} \cdot \frac{1+\gamma H^3}{1+H^3}}}{1 - \lambda^4} \tag{5.10}$$

The following parameters, the definitions of which are contained on unnumbered pages headed "Symbols" of the Muijderman publication, were used in these equations:

PARAMETERS $\eta = 1.8 \times 10^{-3}$ (N sec/m$^2$) (for air)
$\omega = 100,000$ rpm/60 × 2$\pi$ (rad/sec)
$r_2 = 1$ (cm)
$H = h_2/h_1 = h_2/h_0 + h_2$ $h_1 = 20$ ($\mu$m)
$\alpha = 20$ (deg)
$\gamma = a_2/a_1 = 2$
$\lambda = r_1/r_2 = 0.5$
e = electrical analog of pressure, in volts Using these parameters, the value of Wt was calculated from the equations for different gap sizes. When this was plotted on a graph of load carrying capacity in Newtons vs. gap size, the graph of attached FIG. 6 was obtained, showing that the load carrying capacity drops to zero at about 0.04 mm. The load capacity at a gap of 0.02 mm is at a level such that substantially no dynamic pressure is generated. The gap of 0.02 mm is the predetermined distance.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A roller and roller support structure for rotatably supporting said roller, comprising:
   a hollow roller;
   a shaft rotatably supporting said roller and allowing axial movement of said roller therealong;
   a plurality of first grooves in at least one of an inner peripheral surface of said hollow roller and an outer peripheral surface of said shaft for generating a dynamic pressure between said shaft and said roller when said roller is rotated on said shaft;
   first and second retaining plates fixed to said shaft at axially opposite ends of said hollow roller and having roller-facing faces confronting respective end faces of said hollow roller;
   a plurality of second grooves in at least one of one end face of said hollow roller and the roller-facing face confronting said one end face of said hollow roller, and in at least one of the other end face of said hollow roller and the roller-facing face confronting said other end face, said roller and said retaining plates having a size and said second grooves having a shape for, when said end faces of said hollow roller and the roller-facing faces confronting the respective end faces are spaced less than a predetermined distance, generating a gradually increasing dynamic pressure between said roller and the respective end plates the closer said end faces and roller facing faces come when said roller and said shaft are relatively rotated under predetermined conditions of speed and viscosity of medium between said end faces and said retaining plates;
   said roller-facing faces being spaced from each other a distance greater than the axial length of said hollow roller plus twice said predetermined distance;
   said predetermined distance being a distance which, when said hollow roller has said end faces spaced from said roller facing faces at least said predetermined distance, said second grooves at most generate substantially no dynamic pressure when said roller and said shaft are relatively rotated at said predetermined conditions of speed and viscosity of medium, and when said hollow roller moves axially along said shaft to bring one or the other end faces closer to a respective roller-facing face than said predetermined distance while said roller and said shaft are relatively rotating at said predetermined conditions of speed and viscosity of medium, a gradually increasing dynamic pressure greater than said substantially no dynamic pressure is generated between said roller and the respective roller facing end face.

2. The roller and roller supporting structure as set forth in claim 1, wherein the first and second retaining plates are formed of plastic having lubricity.

3. The roller and roller supporting structure as set forth in claim 1, wherein the shaft has an intermediate shaft part and opposite end parts on opposite ends of said intermediate shaft part, said intermediate shaft part having a diameter larger than that of the opposite end parts, the roller being mounted in an axially central portion of the intermediate shaft part, and the first and second retaining plates are fixed to respective opposite end parts of the shaft with the first and second retaining plates against end faces of the intermediate shaft part.

* * * * *